(12) United States Patent
Turakhia et al.

(10) Patent No.: US 9,745,409 B2
(45) Date of Patent: Aug. 29, 2017

(54) LIQUID EPOXY RESIN FORMULATIONS

(75) Inventors: Rajesh H. Turakhia, Lake Jackson, TX (US); Cui-ping Chen, Shanghai (CN); Bill Z. Dellinger, Angleton, TX (US); Ludovic Valette, Perrysburg, OH (US); Itaru Kudose, Lake Jackson, TX (US); Ha Q. Pham, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 43 days.

(21) Appl. No.: 14/351,273

(22) PCT Filed: Nov. 1, 2011

(86) PCT No.: PCT/CN2011/081616
§ 371 (c)(1),
(2), (4) Date: Apr. 11, 2014

(87) PCT Pub. No.: WO2013/063753
PCT Pub. Date: May 10, 2013

(65) Prior Publication Data
US 2014/0256856 A1    Sep. 11, 2014

(51) Int. Cl.
| C08G 59/24 | (2006.01) |
| C08G 59/42 | (2006.01) |
| C08G 59/50 | (2006.01) |
| C08L 63/00 | (2006.01) |
| C09D 163/00 | (2006.01) |
| C09J 163/00 | (2006.01) |
| C08G 59/06 | (2006.01) |

(52) U.S. Cl.
CPC ............ *C08G 59/063* (2013.01); *C08L 63/00* (2013.01)

(58) Field of Classification Search
None
See application file for complete search history.

(56) References Cited

U.S. PATENT DOCUMENTS 3,775,335 A  *  11/1973  Irwin ................... C08F 236/04
                                             252/182.19
4,026,761 A     5/1977  Vargiu et al.
4,846,905 A  *   7/1989  Tarbutton .............. C08G 59/62
                                             525/119
5,760,106 A  *   6/1998  Pinnavaia .............. C08G 59/50
                                             523/209
8,742,055 B2 *   6/2014  Carlberg ............. C08G 59/066
                                             525/507

FOREIGN PATENT DOCUMENTS

| CN | 1546548 | 11/2004 |
| CN | 1590498 | 3/2005 |
| CN | 101613458 | 12/2009 |
| CN | 102250314 | 11/2011 |
| WO | WO 0000533 | 6/2000 |
| WO | WO 2011/084304 A1 * | 7/2011 | ............. C08G 59/00 |

OTHER PUBLICATIONS

Technical Data Sheet for EPON 828, provided by Hexion (2005).*

* cited by examiner

*Primary Examiner* — Michael J Feely
(74) *Attorney, Agent, or Firm* — Polsinelli PC

(57) ABSTRACT

A liquid epoxy resin composition having a reduced tendency to crystallize including at least one liquid epoxy resin having the following generic chemical Structure (I): where n is 0 or an integer of 1 or more; and wherein n=0 is in the range of between about 1 wt % and about 90 wt %; wherein; n=1 is in the range of between about 7 wt % and about 20 wt %; n=2 is in the range of between about 0.8 wt % and about 3 wt %; and n=3 and above is in the range of about 0 wt % and about 2 wt %.

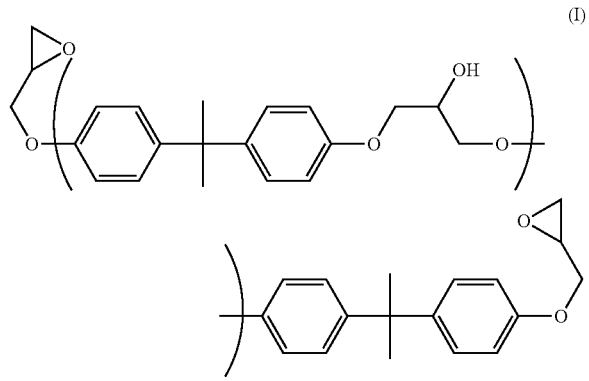

16 Claims, 1 Drawing Sheet

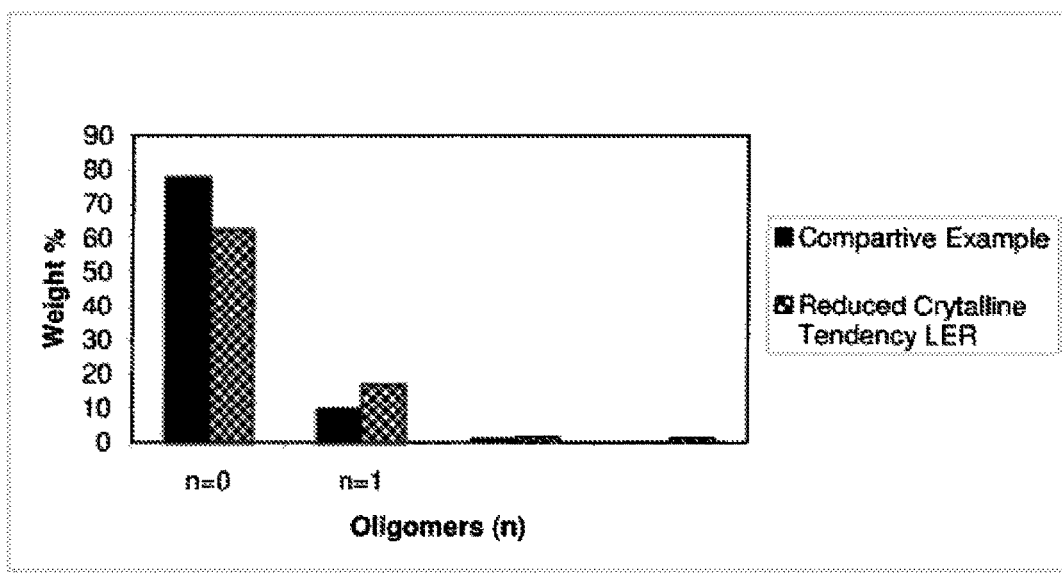

LIQUID EPOXY RESIN FORMULATIONS

BACKGROUND OF THE INVENTION

Field of the Invention

The present invention relates to liquid epoxy resins and liquid epoxy resin blends that exhibit a reduced tendency to crystallize i.e. crystallization resistance. The reduced crystallization tendency liquid epoxy resin, liquid epoxy resin blends, and their thermoset formulations of the present invention are useful, for example, in coatings, adhesives and composites applications.

Description of Background and Related Art

Liquid epoxy resins (LER), for example LERs based on diglycidyl ether of bisphenol-A, are important raw materials for coatings, adhesives and composites applications. However, these LERs exhibit a high tendency to crystallize at lower temperatures of about 0° C. to ambient temperature (about 25° C.). Crystallization poses a handling problem for some customers using the LERs. It would therefore be an advantage to eliminate, or at least minimize, the crystallization tendency of liquid epoxy resins and liquid epoxy resin blends. The tendency of LER to crystallize depends on several factors including for example purity, composition, additives, water content of the LER; and some external factors such as storage history and temperature.

"Tendency to crystallize" or "crystallization tendency" is an intrinsic property of liquid epoxy resins that, under certain conditions, the liquid epoxy resins crystallizes. "Crystallization" may take the form of turbidity or of crystals in the resin or on the container housing the resin. Occasionally, crystallization may continue to the point where complete solidification of the resin occurs. This solidification occurrence is not an indication that an epoxy resin is contaminated or out of specification. Rather, crystallization is a phenomenon which can occasionally occur during storage at room temperature (about 25° C.) or below. A LER exhibiting a "reduced crystallization tendency" means that crystallization of the LER is delayed or eliminated when compared with a conventional liquid epoxy resin and liquid epoxy resin blend.

Heretofore, one recommendation to prevent LER crystallization has been to properly store liquid epoxy resins, particularly at moderate to higher temperatures for an extended period of time. Storage of LER at temperatures above 55° C. for an extended period of time may provide an LER that is satisfactory for processing purposes, however, at these high temperatures, some color develops in the LER. Storage at 55° C. will reduce viscosity as well as prevent crystallization. Storage at temperatures at 55° C. to 75° C. will have some negative effect on color. It is not always possible to store a resin in a warmer or temperature controlled environment. Epoxy resin samples already in store shelves, stored in warehouses, or in transit are prone to crystallization at lower temperatures.

There are other methods that have been used heretofore to minimize or prevent the crystallization of LER. For example, LER crystallization tendency can be decreased by (1) blending the LER with diluents like cresyl diglycidyl ether (CGE) and p-t-butylphenyl glycidyl ether; (2) blending LER with another epoxy resin such as D.E.R. 354 (bisphenol F epoxy resin); or (3) modifying LER such as by esterifying LER with a long chain monocarboxylic acid such as a tall oil fatty acid, lauric acid, or linseed oil. The effectiveness of the above solutions varies in reducing crystallization tendencies and some of the above solutions are effective at the expense of higher cost and/or poorer performance. Therefore, the work used heretofore to reduce or prevent the crystallization of LER still needs further improvement.

There is definitely a need for a low cost reduced crystallization tendency LER with minimal negative performance properties of the final coating made from the LER. It would advance the industry if the crystallization tendency of LERs and/or liquid epoxy resin blends could be reduced without sacrificing any of the beneficial properties of the LER and/or the final thermoset made from the LER. Therefore, it is desired to provide a liquid epoxy resin with reduced crystallization tendency which not only achieves a sufficient crystallization resistance but also does not impact the final LER performance properties and/or cost.

SUMMARY OF THE INVENTION

The present invention is directed to reduce the crystallization tendency of liquid epoxy resins and liquid epoxy resin blends. Liquid epoxy resins of the present invention, for example resins based on diglycidyl ether of bisphenol A, exhibit a tendency to crystallize at ambient and lower temperatures. It is an objective of the present invention to reduce the crystallization tendency of the liquid epoxy resins and liquid epoxy resin blends such that these resins can be useful as raw materials for the coatings, adhesives and composites markets.

In one embodiment of the present invention, the problem of crystallization tendency of a liquid epoxy resin (LER) is solved by preparing a LER with a predetermined distribution of oligomers. For example, the LER of the present invention, such as shown in Structure (I), contains a lower (n=0) oligomeric content and a higher (>n=0) oligomeric content. This significant modification of the LER's oligomeric distribution results in the surprising phenomena of reducing the crystallization tendency of the LER and LER blends.

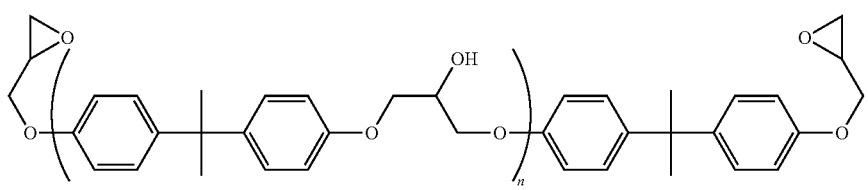

Structure (I)

LERs with the above oligomeric distribution have been found to have an improvement in crystallization resistance; and the LERs of the present invention provide a good cost performance balance while maintaining a high Tg and mechanical performance of the resin. In addition, the present invention formulations containing the above LERs are suitable for high performance applications, such as for example, composites and wind blade manufacturing.

BRIEF DESCRIPTION OF THE DRAWINGS

For the purpose of illustrating the present invention, and not to be limited thereby, the following drawing is included herein wherein:

FIG. 1 is a bar graph showing an oligomer distribution of a liquid epoxy resin product of the present invention compared to an oligomer distribution of a standard epoxy resin product with a high crystallization tendency.

DETAILED DESCRIPTION OF THE INVENTION

General Procedure for Measuring Crystallization

There are a number of methods across the industry used for determining the tendency of LER to crystallize. Most of these known methods have significant differences and thus the results of these methods typically cannot be compared easily against each other with confidence. To move toward a uniform common method for use by the industry globally, so that consistent results can be obtained, the International Organization for Standardization (ISO) has now a validated method, ISO 4895, for determining the tendency of liquid epoxy resins to crystallize. The ISO 4895 method is used herein to determine the tendency of liquid epoxy resins to crystallize. Generally, the method involves the following procedure:

Calcium carbonate powder is mixed with a liquid epoxy resin dissolved in ethanol. The resulting mixture is kept at a specified low temperature and observed at specified time intervals to compare the changes in fluidity and crystallization.

The apparatus used in the method includes a refrigerator or cold enclosure, maintained at 10° C.±2° C. A glass test tube, of capacity approximately 100 milliliters (mL), 40 millimeters (mm) in diameter and 80 mm in height, with a polyethylene-covered stopper is used to obtain samples. A glass rod of hard glass, approximately 10 mm in diameter, is also used to obtain samples. An oven and an analytical balance are used to measure results.

Some of the important steps in the procedure to measure tendency of liquid epoxy resins to crystallize include for example, the following:

(1) Weigh 20 grams (g) of a sample of liquid epoxy resin into the test tube.

(2) Stopper the test tube and place the test tube in the oven at 60° C.±2° C. for 16 hours.

(3) After the above time period in the oven, cool the test tube to room temperature (23° C.±5° C.), add 20 g of calcium carbonate and 2 g of ethanol, and mix the resulting sample thoroughly with the glass rod for 2 minutes.

(4) Stopper the test tube again and place the test tube in a vertical position in the refrigerator at 10° C.±2° C.

(5) Observe the sample twice a day at a specified time (for example at an interval of 8 hours during the day and 16 hours during the night) such as for example the following schedule:

start at 9 a.m.;
first observation at 5 p.m.;
second observation at 9 a.m. (next day);
third observation at 5 p.m. (next day); and
fourth observation at 9 a.m. (the day after).

The above observations of the sample may be carried out, for example, in the following way:

Allow the test tube to warm to room temperature (23° C.±5° C.), then place the test tube in a horizontal position along the longitudinal center axis of the test tube and leave the test tube in the horizontal position for 1 minute; and then record one of the following notations:

if the sample is still in the liquid state, record "a";
if the sample does not flow during the 1 minute, record "b"; or
if the sample has completely solidified due to crystallization, record "c".

After each of the above observations, if the sample has not yet crystallized, mix thoroughly with the glass rod for 2 minutes. Record the number of days which elapse to each stage of crystallization.

The "tendency of a liquid epoxy resin to crystallize" result is expressed as the number of days which elapse until each stage specified above, "a", "b" and "c", is reached.

Since it is a "tendency" property which is being assessed by the above process, precision in results, in the generally accepted sense of the term for test methods, can vary slightly. However, the above method is currently the state of the art; and the method can be reliable and acceptable in the industry.

One broad aspect of the present invention is directed to preparing a LER with a predetermined oligomeric distribution in order to solve the problem of crystallization tendency of LERs.

The problem of tendency to crystallization may be solved by producing a LER with a different oligomer distribution. In one embodiment, the LER of the present invention contains a lower n=0 oligomer content and a higher oligomer (>n=0) content. This modification of the oligomer distribution unexpectedly results in reducing the crystallization tendency of LERs and LER blends.

One important aspect of the present invention is directed to a modifying and controlling the oligomer distribution of a LER such that the LER may contain a particular oligomer distribution which, it is theorized, is responsible for disrupting the crystallization in the LER; and hence, the LER will exhibit a reduced tendency to crystallize.

In one embodiment of the present invention, a LER composition having a reduced crystallization tendency is prepared by manufacturing the LER with an optimum predetermined oligomer distribution. For example, the reduced crystallization tendency epoxy resin composition of the present invention includes at least one LER, such as a liquid bisphenol-A epoxy resin, with a predetermined oligomeric distribution.

The LER composition of the present invention may be defined by chemical Structure (I) as follows:

Structure (I)

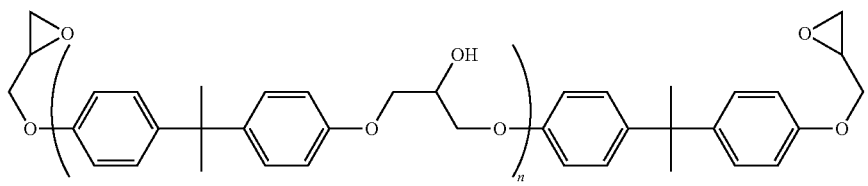

where n is 0 or an integer of 1 or more; and wherein the LER composition contains a mixture of oligomers, i.e., an oligomeric distribution.

Preferably, the oligomeric distribution of the LER with reduced crystallization tendency, as defined by Structure (I), comprises a content of n=0 which is generally in the range of between about 1 weight percent (wt %) and about 90 wt %; preferably between about 20 wt % and about 80 wt %, more preferably between about 40 wt % and about 70 wt %, and even more preferably between about 50 wt % and about 75 wt %; a content of n=1 which is generally in the range of between about 7 wt % and about 25 wt %, preferably between about 10 wt % and about 22 wt %, and more preferably between about 14 wt % and about 20 wt %; a content of n=2 which is generally in the range of between about 0.8 wt % and about 3 wt %, preferably between about 0.9 wt % and about 2.8 wt %, and more preferably between about 1 wt % and about 2.5 wt %; and a content of n=3 and higher oligomers which is generally between about 0 wt % and about 2 wt %, preferably between about 0.1 wt % and about 1.8 wt %, and even more preferably between about 0.5 wt % and about 1.5 wt %.

Preferably, the oligomeric distribution of the LER with reduced crystallization tendency as defined by Structure (I) comprises a ratio of n=0/n=1 which is generally in the range of between about 2 and about 6; preferably between about 2.3 and about 5.7, more preferably between about 2.5 and about 5.5, and even more preferably between about 3 and about 5.3; a ratio of n=0/n=2 which is generally in the range of between about 15 and about 100, preferably between about 20 and about 75, and more preferably between about 30 and about 60; a ratio of n=1/n=2 which is generally in the range of between about 4 and about 30, preferably between about 5 and about 20, and more preferably between about 6 and about 15; and a ratio of n=0/n=3 which is generally in the range of between about 0 and about 300, preferably in the range of from about 0 to about 200; more preferably from about 20 and about 100, and even more preferably between about 33 and about 83.

Preferably, the epoxy equivalent weight (EEW) of the LER, as defined by Structure (I), is generally between about 170 and about 400; preferably, between about 175 and about 300; and more preferably, between about 180 and about 250.

The reduced crystallization LER composition of the present invention may be blended with optional components such as for example at least one aliphatic glycidyl ether or aliphatic diglycidyl ether. For example, the aliphatic diglycidyl ether may be defined by chemical Structure (II) and the aliphatic glycidyl ether may be defined by chemical Structure III as follows:

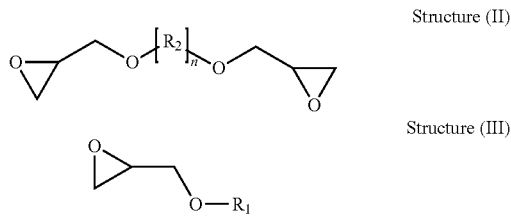

Structure (II)

Structure (III)

where n is an integer of 1 or more; and $R_1$ and $R_2$ can be independently an aliphatic hydrocarbon chain, a cycloaliphatic hydrocarbon chain, a polyether chain, a polyethylene chain, or a polypropylene chain.

Preferably, the aliphatic ether may be selected from low viscosity aliphatic glycidyl or diglycidyl ethers or blends of two or more low viscosity aliphatic glycidyl or diglycidyl ethers.

The aliphatic glycidyl ethers may also include ethers such as cresyl glycidyl ether; ($C_{12}$-$C_{14}$) alkyl glycidyl ether; 2-ethylhexyl glycidyl ether; and the like. The aliphatic diglycidyl ether can be, for example, D.E.R.® 732 or D.ER. 736 commercially available from The Dow Chemical Company; 1,4-butanediol diglycidyl ether; 1,6-hexanediol diglycidyl ether; 1,4-cyclohexanedimethanol diglycidyl ether, or other glycidyl ethers, diglycidyl ethers, and polyglycidyl ethers, or mixtures thereof.

Preferably, the concentration of aliphatic diglycidyl ethers and aliphatic diglycidyl ethers defined by Structures (I) and (II) present in the epoxy resin composition of the present invention is generally between about 2 wt % and about 40 wt %; preferably, between about 5 wt % and about 30 wt %; and more preferably, between about 8 wt % and about 25 wt %; all the percentages being by weight based on the total formulation.

The results of testing the reduced crystallization tendency of a LER composition of the present invention is expressed as the number of days which elapse until each stage specified above, "a", "b" and "c, as measured by ISO 4895 at 5±2° C. environment is generally above about 4 days; preferably above about 7 days; more preferably above about 15 days; and even more preferably above about 30 days.

Preferably, the viscosity of the LER and LER blends comprising the epoxy resin composition of the present invention, as measured by a Cone & Plate viscometer or Cannon Fenske tubes at 25° C., is generally between about 50 mPa·s to about 30000 mPa·s. In one embodiment, the viscosity of the epoxy resin composition may be from about 100 mPa·s and about 28000 mPa·s, more preferably between about 200 mPa·s and about 25000 mPa·s; and even more preferably between about 250 mPa·s and about 20000 mPa·s.

In another embodiment of the present invention, a thermoset formulation, using the reduced crystallization tendency epoxy resin composition product discussed above, can be prepared by admixing, for example, the following components:

(i) the aforementioned reduced crystallization tendency epoxy resin composition; and (ii) at least one epoxy resin hardener such as an amine hardener.

The amount of reduced crystallization tendency LER or LER blend used in the thermoset formulation depend on a variety of factors including the equivalent weight of the epoxy resin and hardener, as well as the desired properties of the products made from the composition. In general, the amount of reduced crystallization tendency LER or epoxy resin blend used may be from about 1 wt % to about 99 wt % in some embodiments, from about 20 wt % to about 95 wt % in other embodiments, and from about 40 wt % to about 90 wt % in yet other embodiments, based on the total weight of the curable composition.

The hardeners useful in the thermoset formulation of the present invention can be amines, anhydrides, acids, and mixtures thereof. For example, the amines can be commercially available aliphatic amines, cycloaliphatic amines, polyether amines, polyamides, amidoamines, Mannich bases, other common amines used in the curing of epoxy resin and epoxy resin blends, and mixtures thereof. The acid hardeners can be multifunctional aliphatic or aromatic acids. Cycloaliphatic anhydride hardeners may include, for example, nadic methyl anhydride, hexahydrophthalic anhydride, tetrahydrophthalic anhydride, methyl tetrahydrophthalic anhydride, methyl hexahydrophthalic anhydride and their derivatives; and mixtures thereof. Aromatic anhydrides may include, for example, phthalic anhydride, trimellitic anhydride and mixtures thereof.

The amount hardener used in the thermoset formulation may depend on a variety of factors including the equivalent weight of the resin and hardener, as well as the desired properties of the products made from the composition. In general, the amount of hardener may be from about 1 wt % to about 99 wt % in some embodiments, from about 5 wt % to about 80 wt % in other embodiments, and from about 10 wt % to about 60 wt % in yet other embodiments, based on the total weight of the curable composition.

Optionally, the epoxy resin thermoset formulation of the present invention may include one or more of the following additives including toughening agents, wetting agents, colorants, pigments, thermoplastics, fillers (carbon fiber, glass fiber, glass spheres, high aspect ratio fillers, etc), UV blocking compounds, UV stabilizers, coupling agents, catalysts, fluorescent compounds, impact modifiers, viscosity controlling agents, reactive and non-reactive diluents, other known additives, and mixtures thereof.

In one embodiment, the reduced crystallization liquid epoxy resin is made, for example, in three steps including (1) manufacturing a liquid epoxy resin such as D.E.R. 331 and D.E.R. 383; (2) molecularly distilling the above liquid epoxy resin of step (1) such as D.E.R. 331 and D.E.R. 383; and (3) blending appropriate fractions of oligomers from the distillation process step (2) above to produce the LER of the present invention.

The first step in the above process comprises the manufacture of a LER. The first step in the above process, manufacturing a LER, is a standard process known in the art, and may be carried out, such as for example, as described in U.S. Pat. No. 4,449,255, incorporated herein by reference.

The second step in the above process, the molecular distillation of the LER, is performed to separate any oligomers formed in the process. The distillation process step is well known in the art; and may be carried out by any of the known processes, such as for example as described in Kramkowski et al., "Preparation of Pure Diglycidyl Ether of Bisphenol A by Molecular Distillation of Crude Epidian-6"; Politech, Wroclawska, Wroclaw, Pol. Przemysl Chemiczny; (1997), 76(11), pp. 483-484; Spychaj et al., "The Fractionation of Epoxy Resins. Part II. Molecular Distillation of Epidian-6 Resin and Characterization of Fractions"; Inst. Technol. Chem.; Politech, Szczecinska, Szczecin, Pol., Polimery (Warsaw, Poland) (1984), 29(3), 102-4; Bondarenko et al., "Distillation of Low-Molecular-Weight Epoxy Resins, Plasticheskie Massy, (1986), (8), 44-6; or Spychaj et al., "Studies on the Fractionation of Epoxy Resins. Part I. Fractionation of Epidian 5 Resin"; Inst. Technol. Chem.; Politech, Szczecinska, Szczecin, Pol.; Polimery (Warsaw, Poland) (1983), 28(6), 202-5; all of which are incorporated herein by reference.

The third step of the above process, blending of appropriate fractions of oligomers from the above distillation process step (2), results in the production of the LER product of the present invention having a reduced crystallization tendency.

The LER and LER blend thermoset formulations of the present invention can be cured at a low temperature, a room temperature, or an elevated temperature by processes well known in the art. In general, the curing temperature may be from 0° C. to about 300° C. in some embodiments, from about 10° C. to about 250° C. in other embodiments, and from about 25° C. to about 200° C. in yet other embodiments.

Preferably, the glass transition temperature (Tg) of the present invention epoxy resin formulation is generally between about 0° C. and about 300° C.; preferably between about 20° C. and about 250° C.; and more preferably between about 40° C. and about 200° C. The Tg data is measured by DSC with a 10° C./minute temperature increase rate during the test.

In one embodiment, the reduced crystallization resistant epoxy formulation of the present invention can be used in coatings, composites, and adhesives applications like flooring; civil engineering applications; marine and protective coatings; composites; coatings such as for metal protection, furniture, and architectural coatings.

EXAMPLES

The following Examples are set forth to illustrate various embodiments of the present invention; and are not intended to limit the scope of the present invention. Unless otherwise stated all parts and percentages in the Examples are by weight.

Various terms, abbreviations and designations for the raw materials used in the following Examples are explained as follows:

"LER-1" is a liquid diglycidyl ether of bisphenol A epoxy resin having an EEW of about 185, and commercially available from The Dow Chemical Company. LER-1 is used herein as a comparative example.

"LER-2" is a liquid diglycidyl ether of bisphenol A epoxy resin having an EEW of about 180, and commercially available from The Dow Chemical Company. LER-2 is used herein as a comparative example.

"LER-3" is a liquid diglycidyl ether of bisphenol A epoxy resin having an EEW of about 187, and commercially available from The Dow Chemical Company. LER-3 is used herein as a comparative example.

"LER-4" is a liquid diglycidyl ether of bisphenol A having an EEW of about 182, and commercially available from Huntsman. LER-4 is used herein as a comparative example.

"LER-5" is a liquid diglycidyl ether of bisphenol A having an EEW of about 188, and commercially available from Hexion Specialty. LER-5 is used herein as a comparative example.

"LER-6" is a liquid diglycidyl ether of bisphenol A epoxy resin blend having an EEW of about 200, and commercially available from The Dow Chemical Company. LER-6 is used herein as a comparative example.

"LER-A" is a liquid epoxy resin with reduced crystallization tendency and an EEW of about 188-200.

"LER-B" is a liquid epoxy resin with reduced crystallization tendency and an EEW of about 180-192.

"Aliphatic diglycidylether A-1" is 1,4-butanedioldiglycidyl ether, a low viscosity diglycidyl ether according to Structure (II) having an $R_2=CH_2$, n=4; and an EEW of about 136.

"Aliphatic glycidylether A-2" is ($C_{12}$-$C_{14}$) alkylglycidyl ether with an EEW of about 290.

"XZ 92594.00" is a commercially available amine hardener having an AHEW of about 50.9, and commercially available from The Dow Chemical Company.

In the following Examples, standard analytical equipment and methods are used such as for example, as follows:

Crystallization Resistance

The crystallization days from A to B condition data is measured by ISO 4895 at 5±2° C. using specific particle size distribution CaCO$_3$ (OMYACARB 5), wherein every experiment uses one control sample. A more detailed procedure used to determine crystallization resistance is as follows:

Weigh 20 g of liquid epoxy resin into the test tube. Stopper the test tube and place the test tube in an oven at 60° C.±2° C. for 16 hours. Cool the test tube to room temperature (23° C.±5° C.), add 20 g of calcium carbonate and 2 g of ethanol, and mix the sample thoroughly with a glass rod for 2 minutes. Stopper the test tube again and place the test tube in the vertical position in a refrigerator at 10° C.±2° C.

Observe the sample twice a day at a specified time (for example at an interval of 8 hours during the day and 16 hours during the night). For example:

start 9 a.m.
first observation 5 p.m.
second observation 9 a.m. (next day)
third observation 5 p.m. (next day)
fourth observation 9 a.m. (the day after) and so on Observe the sample according to the following procedure:
Allow the test tube to warm to room temperature (23° C.±5° C.), then place the test tube in the horizontal position and leave the test tube for 1 minute.

If the sample is still in the liquid state, record "a".
If the sample does not flow during the 1 minute, record "b".
If the sample has completely solidified due to crystallization, record "c".

After each observation, if the sample has not yet crystallized, mix thoroughly with a glass rod for 2 minutes. Record the number of days which elapse to each stage of crystallization.

Tendency to Crystallize

The tendency of a liquid epoxy resin to crystallize is expressed as the number of days which elapse until each stage, "a", "b" and "c", as specified in the above procedure for measuring this property, is reached.

Viscosity

The viscosity is measured by a Cone & Plate viscometer at 25° C. using #20 cone. The variance of this test is estimated to be about ±10 percent (%). An alternate way of measuring viscosity is by Cannon Fenske tubes using ASTM D445.

Glass Transition Temperature (Tg)

The Tg data is measured by TA DSC Q2000 with a 10° C./minute temperature ramp rate during the test. Tg was reported as the extrapolated tangent Half-Height point. The specimen was cured with XZ 92594.00 completely under 70° C. over 7 hours and 140° C. over 15 minutes. The reproducibility of the method was estimated to be about ±3° C.

Preparation of Clear Casting

Formulations are prepared by blending the compositions of the present invention and an amine hardener such as XZ 92594.00. Except as otherwise mentioned, castings are cured in a ventilated oven for 7 hours at 70° C. The formulations are degassed under vacuum for 15 minutes. Castings are prepared by pouring the formulations into open molds. Castings are slowly cooled to ambient temperature over about 60 minutes.

Analysis

Comparative LERs: LER-2, LER-3, LER-4, and LER-5; and the LERs with reduced crystallization tendency were evaluated by HPLC analysis. Table I clearly shows the differences between the comparative LERs and the LER with reduced crystallization tendency. The LER with reduced crystallization tendency has a much different oligomer distribution which helps reduce the crystallization tendency of the liquid epoxy resin. In general, the LER with reduced crystallization tendency has lower n=0 oligomers and higher n=1 and n=>1 oligomers. The oligomer differences between Comparative LERs and the reduced crystallization tendency LER are also shown in FIG. 1.

TABLE I

HPLC Analysis

| Oligomer Species | Comparative LER-4 from Huntsman | Comparative LER-2 from Dow | Comparative LER-3 from Dow | Comparative LER-5 from Hexion | Reduced Crystalline Tendency LER |
|---|---|---|---|---|---|
| n = 0 | 78.7 | 82.18 | 80.02 | 79.53 | 50-75 |
| n = 1 | 12.55 | 8.30 | 8.30 | 13.90 | 14-20 |
| n = 2 | 1.03 | 0.57 | 0.48 | 1.72 | 1-2.5 |
| n = 3 and above | 0.2 | 0.1 | 0.1 | 0.2 | 0.9-1.5 |
| n = 0/n = 1 | 6.22 | 9.9 | 9.64 | 5.72 | 2.5-5.36 |
| n = 0/n = 2 | 75.8 | 144.18 | 166.71 | 46.24 | 20-75 |
| n = 1/n = 2 | 12.18 | 14.56 | 17.29 | 8.08 | 5.6-20 |
| n = 0/n = 3 | 393.5 | 821.8 | 800.2 | 397.65 | 33-83 |

Examples 1 and 2 and Comparative Example LER-3

About 20 g of liquid epoxy resins (Comparative LER-3 and reduced crystalline tendency LER-A samples) were added into a test tube, the test tube was sealed with a stopper, and then the test tube was placed in the oven at 60° C.±2° C. for 16 hours. After the test tube was cooled to room temperature (23° C.±5° C.), 20 g of calcium carbonate and 2 g of ethanol were added to the test tube, and then the resulting sample was mixed thoroughly with a glass rod for 2 minutes. The test tube was stoppered again and placed in a vertical position in a refrigerator at 10° C.±2° C.

The samples were observed twice a day at a specified time (for example at an interval of 8 hours during the day and 16 hours during the night). The results for the formulations of Examples 1 and 2 and Comparative Example LER-3 are shown in Table II.

TABLE II

| Examples | EEW | Viscosity mPa · s @ 25° C. | Days to Crystallize (from 'a' to 'b') |
|---|---|---|---|
| Comparative LER-3 D.E.R. 331 | 187 | 12,339 | 6 |

TABLE II-continued

| Examples | EEW | Viscosity mPa·s @ 25° C. | Days to Crystallize (from 'a' to 'b') |
|---|---|---|---|
| Example 1: LER_A | 188.5 | 12,271 | 9 |
| Example 2: LER_A | 191.5 | 15,654 | 16 |

The results in Table II above show that the reduced crystalline tendency liquid epoxy resins of the present invention (Examples 1 and 2) have an improvement in reduced crystallization tendency as compared with Comparative LER-3. The reduced crystallization tendency of the present invention resin in Examples 1 and 2 is improved by about 50% to about 170%.

Examples 3-6 and Comparative Example B

About 20 g of liquid epoxy resin (Comparative LER-2 and reduced crystalline tendency LER-B samples) were added into a test tube, the test tube stoppered, and then placed in an oven at 60° C.±2° C. for 16 hours. The test tube was then cooled to room temperature (23° C.±5° C.). Then, 20 g of calcium carbonate and 2 g of ethanol were added to the test tube and the resultant sample thoroughly mixed with a glass rod for 2 minutes. A stopper was placed on the test tube again and then placed in a vertical position in a refrigerator at 10° C.±2° C.

The sample was observed twice a day at a specified time (for example at an interval of 8 hours during the day and 16 hours during the night). The results for formulations of Examples 3 to 6 and Comparative Example B are shown in Table III wherein the present invention liquid epoxy resin is compared with a commercial liquid epoxy resin, LER-2.

TABLE III

| Examples | EEW | Viscosity mPa·s @ 25° C. | Days to Crystallize (from 'a' to 'b') |
|---|---|---|---|
| Comparative LER-2 D.E.R. 383 | 180.4 | 9,550 | 8 |
| Example 3: LER-B | 183.9 | 11,154 | 10 |
| Example 4: LER-B | 186.2 | 13,414 | 14 |
| Example 5: LER-B | 186.2 | 13,414 | 14 |
| Example 6: LER-B | 190.2 | 17,369 | 24 |

The reduced crystallization tendency of the present invention resin in Examples 3 to 6, as shown in Table III above, is improved by about 25% to about 200%.

Examples 7-9 and Comparative Example C

About 20 g of liquid epoxy resin blend (Comparative LER-6 blend and reduced crystalline tendency LER-A blend samples made with LER-A and aliphatic glycidylether A-2) were added into a test tube, the test tube stoppered, and then the test tube was placed in an oven at 60° C.±2° C. for 16 hours. Then the test tube was cooled to room temperature (23° C.±5° C.). Thereafter, 20 g of calcium carbonate and 2 g of ethanol were added to the test tube and the sample was mixed thoroughly with a glass rod for 2 minutes. A stopper was placed on the test tube again and then placed in a vertical position in a refrigerator at 10° C.±2° C.

The samples were observed twice a day at a specified time (for example at an interval of 8 hours during the day and 16 hours during the night). The results for formulations of Examples 7 to 9 and Comparative Example LER-6 are shown in Table IV wherein the present invention liquid epoxy resin blend is compared with a commercial liquid epoxy resin blend, LER-6.

TABLE IV

| Examples | LER-A (wt %) | Aliphatic glycidylether A-2 (wt %) | D.E.R. * 324 (wt %) | EEW | Viscosity mPas @ 25° C. | Days to Crystallize ('a' to 'b') |
|---|---|---|---|---|---|---|
| Comparative Example LER-6 D.E.R 324 | — | — | 100 | 197.2 | 698 | 17 |
| Example 7 | 84 | 16 | — | 204.3 | 1079 | >41 |
| Example 8 | 80 | 20 | — | 215.0 | 910 | >41 |
| Example 9 | 75 | 25 | — | 231.7 | 805 | >41 |

As shown in Table IV above, the Comparative epoxy resin blend, LER-6, crystallized in 17 days. The epoxy resin blend made with the present invention liquid epoxy resin, LER-4, did not crystallize in 41 days (greater than about 140%) at which time the experiments were stopped.

Examples 10-14 and Comparative Example LER-1

About 20 g of liquid epoxy resin blend (Comparative LER-1 mixed with aliphatic diglycidylether A-1 or 1-4-butane diglycidylether and reduced crystalline tendency LER-A mixed with aliphatic diglycidylether A-1 or 1-4-butane diglycidylether) were added into a test tube, the test tube stoppered, and then the test tube was placed in an oven at 60° C.±2° C. for 16 hours. Then, the test tube was cooled to room temperature (23° C.±5° C.). After cooling the test tube, 20 g of calcium carbonate and 2 g of ethanol were added to the test tube and the resultant sample in the test tube was mixed thoroughly with a glass rod for 2 minutes. The test tube was stoppered again and placed in a vertical position in a refrigerator at 10° C.±2° C.

The samples were observed twice a day at a specified time (for example at an interval of 8 hours during the day and 16 hours during the night). The results for formulations of Examples 10 to 14 and Comparative Example LER-1 blend are shown in Table V.

TABLE V

| Example | Comparative LER-1 | Example 10 | Example 11 | Example 12 | Example 13 | Example 14 |
|---|---|---|---|---|---|---|
| LER-A (1) (wt. %) | | 90 | | | | |
| LER-A (2) (wt. %) | | | 83 | | | |
| LER-A (3) (wt. %) | | | | 83 | | |
| LER-A (4) (wt. %) | | | | | 80 | |
| LER-A (5) (wt. %) | | | | | | 80 |
| Comparative LER-1(wt. %) | 86 | | | | | |
| Aliphatic diglycidylether A-1 (wt. %) | 14 | 10 | 17 | 17 | 20 | 20 |
| crystallization days from 'a' to 'b' condition, days | 4.5 | 5.5 | 9 | 11 | 10 | 17 |
| Viscosity @ 25 deg C., mPas | 1423 | 3175 | 1500 | 1625 | 1125 | 1200 |
| Tg, (° C.) | 81 | 88 | 76 | 82 | 74 | 77 |

As shown in Table V above, the formulation of Example 10 showed a higher Tg (88° C.) compared to the Comparative Example LER-1 blend (81° C.) while the crystallization resistance of Example 10 also increased to 5.5 days compared to Comparative Example LER-1 blend of 4.5 days. The formulation of Example 11 showed a higher crystallization resistance (9 days) compared to the Comparative Example LER-1 blend (4.5 days) while the Tg was maintained at 82° C. and the viscosity was maintained at 1625 mPas. The formulation of Example 14 showed a significant improvement of the crystallization resistance of 17 days compared to the Comparative Example LER-1 blend of 4.5 days while the Tg was maintained at 77° C. and the viscosity was maintained at 1200 mPas.

Examples 15-19 and Comparative LER-3 Blend

About 20 g of liquid epoxy resin blend (Comparative LER-3 mixed with aliphatic diglycidyl ether A-1 or 1-4-butane diglycidyl ether and reduced crystallization LER-B mixed with aliphatic diglycidyl ether A-1 or 1-4-butane diglycidyl ether) were added into a test tube, the test tube stoppered, and then placed in an oven at 60° C.±2° C. for 16 hours. Then, the test tube was cooled to room temperature (23° C.±5° C.). Then, 20 g of calcium carbonate and 2 g of ethanol were added to the test tube and the resultant sample in the test tube was thoroughly mixed with a glass rod for 2 minutes. The test tube was then re-stoppered and placed in a vertical position in a refrigerator at 10° C.±2° C.

The results of Examples 15 to 19 and Comparative Example LER-3 are shown in Table VI.

TABLE VI

| Example | Comparative LER-3 | Example 15 | Example 16 | Example 17 | Example 18 | Example 19 |
|---|---|---|---|---|---|---|
| LER-3 | 86 | | | | | |
| LER-B (1) (wt.%) | | 90 | | | | |
| LER-B (2) (wt.%) | | | 83 | | | |
| LER-B (3) (wt.%) | | | | 83 | | |
| LER-B (4) (wt.%) | | | | | 80 | |
| LER-B (5) (wt.%) | | | | | | 80 |
| Alphatic diglycidylether A-1 | 14 | 10 | 17 | 17 | 20 | 20 |
| crystallization days from 'a' to 'b' condition, days | 4.5 | 7 | 9 | 10 | 9 | 14 |
| Viscosity @ 25 deg C., mPas | 1423 | 2925 | 1236 | 1375 | 792 | 972 |
| Tg, (° C.) | 81 | 86 | 76 | 81 | 75 | 78 |

As shown in Table VI above, the formulation of Example 15 showed a higher Tg (86° C.) compared to the Comparative Example LER-3 blend (81° C.) while the crystallization resistance of Example 15 also increased to 7 days compared to Comparative Example LER-3 blend of 4.5 days. The formulation of Example 17 showed higher crystallization resistance (10 days) compared to the Comparative Example LER-3 blend (4.5 days) while the Tg of Example 17 was maintained at 81° C. and viscosity was maintained at 1375 mPas. The formulation of Example 19 showed a significant improvement of the crystallization resistance (14 days) compared to the Comparative Example LER-3 blend (4.5 days) while the Tg was maintained at 78° C. and viscosity was reduced to 972 mPas.

Examples 20-23 and Comparative Example E

Several of the resin compositions prepared in the above Examples were used for preparing a curable resin formulation. The resin compositions used in the formulation are set forth in Table VII. The formulations were cured with XZ 92594.00, an amine hardener. Cured clear cast samples of the compositions of the present invention were cured completely with the amine hardener XZ 92594.00. Mechanical properties of the resultant clear cast samples were measured according to ISO 527-2 for tensile properties and ISO 178 for flexural properties. The results of the measurements are described in Table VII.

TABLE VII

| | Comparative Example | Example 20 | Example 21 | Example 22 | Example 23 |
|---|---|---|---|---|---|
| Resin Composition | Comp.LER-3 Resin | Ex. 12 Resin | Ex. 14 Resin | Ex. 17 Resin | Ex. 19 Resin |
| Max. Tensile strength, MPa | 114 | 111 | 110 | 112 | 110 |
| Elongation at break, % | 5.3 | 5.4 | 5.5 | 5.5 | 5.4 |
| Tensile E-Modulus, MPa | 3160 | 3073 | 3027 | 3013 | 2996 |
| Max. Flexural strength, Mpa | 69 | 67 | 64 | 66 | 63 |
| Flexural strain at Max. flexural stress (%) | 7.2 | 6.9 | 5.5 | 5.5 | 6.6 |
| Flexural E-modulus, MPa | 2588 | 2598 | 2560 | 2568 | 2524 |

The formulations using the resin composition of Examples 12, 14, 17 and 19, respectively, show similar tensile properties compared to the resin composition of Comparative Example LER-3; the maximum tensile strength of all the samples are over 110 MPa, and the maximum flexural strength of all the samples are over 60 MPa. Overall, the mechanical properties of all the Examples were almost identical to the Comparative LER-3 sample which clear indicates that no mechanical properties of the cured product were sacrificed using the present invention liquid epoxy resin with reduced crystallization tendency.

The invention claimed is:

1. A liquid epoxy resin composition having a reduced tendency to crystallize comprising:
   (a) at least one liquid epoxy resin having a reduced tendency to crystallize and the following generic chemical Structure (I):

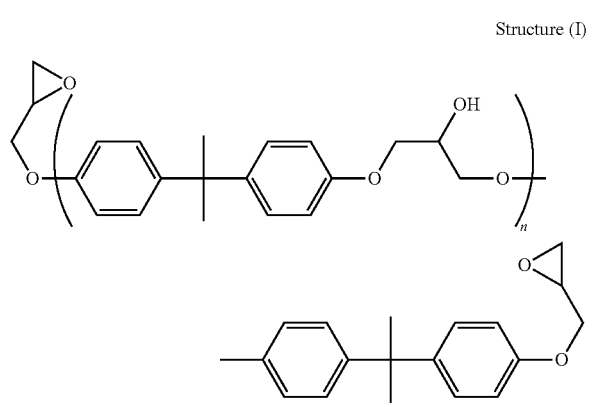

Structure (I)

wherein n is 0 or an integer of 1 or more; and wherein the at least one liquid epoxy resin includes the following oligomeric distribution totaling 100 weight percent (wt %):

wherein n=0 is in the range of between about 70 wt % and about 76 wt %;

wherein n=1 is in the range of between about 20 wt % and about 25 wt %;

wherein n=2 is in the range of between about 2.5 wt % and about 3 wt %; and wherein n≥3 is in the range of between about 1.5 wt % and about 2 wt %; and wherein the oligomeric distribution of the at least one liquid epoxy resin is sufficient to reduce the tendency of the at least one liquid epoxy resin and the liquid epoxy resin composition to crystallize; and (b) at least one epoxy resin other than the at least one liquid epoxy resin of component (a).

2. The liquid epoxy resin composition of claim 1, wherein component (b) comprises (i) an aliphatic, cycloaliphatic or aromatic polyglycidyl ether; or (ii) an aliphatic, cycloaliphatic or aromatic diglycidyl ether; or (iii) an aliphatic, cycloaliphatic or aromatic monoglycidyl ether; or (iv) an aliphatic, cycloaliphatic or aromatic glycidyl ester; or (v) mixtures thereof.

3. The liquid epoxy resin composition of claim 1, wherein component (b) comprises a liquid diglycidyl ether of bisphenol A or bisphenol F or mixture thereof.

4. The composition of claim 1, wherein the viscosity of the composition, as measured by Cone & Plate viscometer or Cannon Fenske tubes at 25° C., is between about 50 mPa's to about 30000 mPa's.

5. The composition of claim 1, wherein the epoxy equivalent weight (EEW) of component (a) is between about 170 and about 400.

6. A process for preparing a thermoset formulation comprising admixing: (i) the liquid epoxy resin composition of claim 1, and (ii) at least one epoxy resin hardener.

7. A thermoset formulation comprising: (i) the liquid epoxy resin composition of claim 1; and (ii) at least one epoxy resin hardener.

8. The thermoset formulation of claim 7, wherein the epoxy resin hardener comprises an amine, an anhydride or mixtures thereof.

9. The thermoset formulation of claim 8, wherein the epoxy resin hardener comprises an aliphatic amine, a cycloaliphatic amine, an aromatic amine, or mixtures thereof.

10. The thermoset formulation of claim 7, wherein the epoxy resin hardener comprises an anhydride which is in liquid form at 25° C.

11. An article made by contacting the thermoset formulation of claim 7 with (iii) a reinforcement material.

12. An article comprising a cured product of claim 11.

13. An article comprising a coating, a composite, a laminate, an adhesive, a sealant, a civil engineering structure, a casting, or a potting structure made from the cured product of claim 12.

14. An article comprising a cured product of claimed 7.

15. An article comprising a coating, a composite, a laminate, an adhesive, a sealant, a civil engineering structure, a casting, or a potting structure made from the cured product of claim 14.

16. A process for preparing a liquid epoxy resin composition having a reduced tendency to crystallize and comprising (a) and (b):

(a) at least one liquid epoxy resin having a reduced tendency to crystallize and the following generic chemical Structure (I):

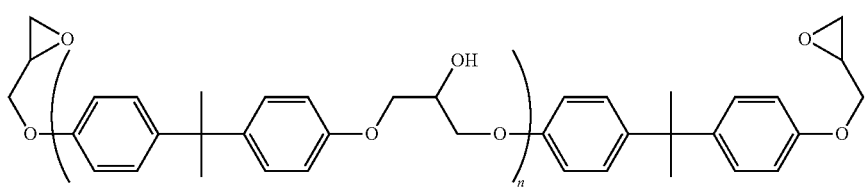

Structure (I)

wherein n is 0 or an integer of 1 or more; and wherein the at least one liquid epoxy resin has an oligomeric distribution totaling 100 weight percent (wt %), and (b) at least one epoxy resin other than the at least one liquid epoxy resin of component (a);

the process comprising:

controlling the oligomeric distribution of the at least one liquid epoxy resin such that: n=0 is in the range of between about 70 wt % and about 76 wt %; n=1 is in the range of between about 20 wt % and about 25 wt %; n=2 is in the range of between about 2.5 wt % and about 3 wt %; and n≥3 is in the range of about 1.5 wt % and about 2 wt %; and combining component (a) with component (b).

* * * * *